(No Model.)
G. W. PACKER.
CORN HARVESTER.
No. 541,875. Patented July 2, 1895.
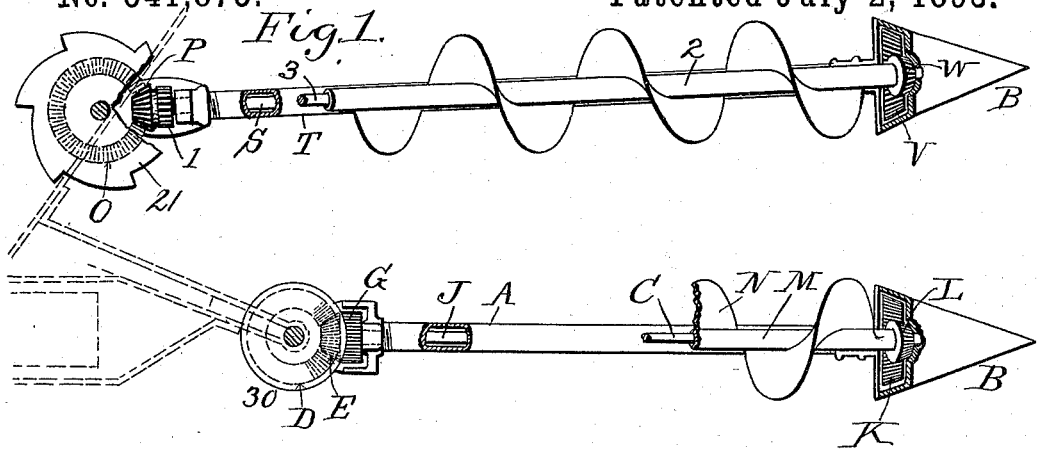
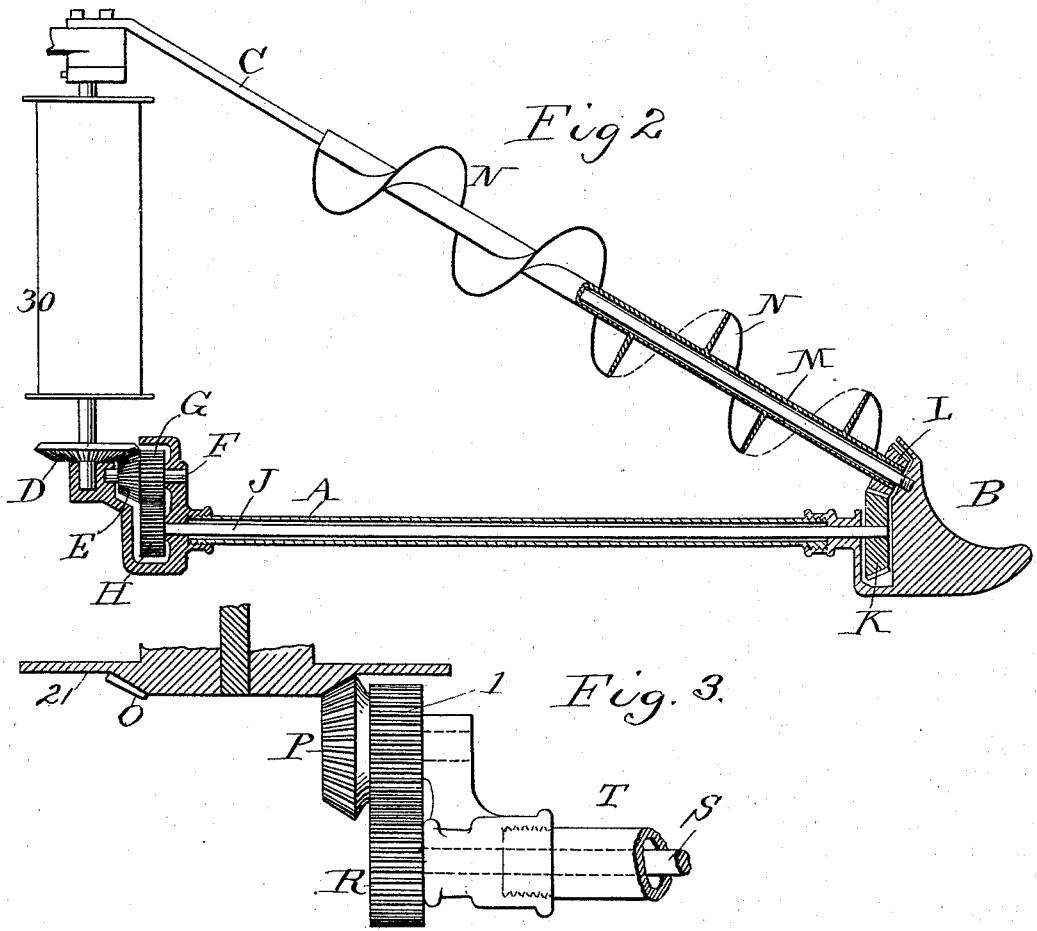
WITNESSES
Cole Burdine
H. A. Dodge
INVENTOR
George W. Packer
by Jno G. Manahan
his Attorney

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

CORN-HARVESTER.

SPECIFICATION forming part of Letters Patent No. 541,875, dated July 2, 1895.

Application filed February 16, 1895. Serial No. 538,685. (No model.)

*To all whom it may concern:*

Be it known that I, GEORGE W. PACKER, a citizen of the United States, residing at Rock Falls, in the county of Whiteside and State of Illinois, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to corn harvesters, and pertains to certain improvements upon the structure shown in United States Letters Patent No. 525,360, granted to me September 4, 1894, for improvements in corn harvesters.

In the patent referred to is represented the location of the usual gathering arms which project diagonally downward and forward in front of the cutting mechanism, and are intended to gather all the stalks into the interval between said arms in which are seated the cutting devices.

In my invention it is the purpose to provide each of said arms with a spiral moving exterior, supplementary to the progressive movement of the machine, and designed to carry the lodged stalks aforesaid, by a spiral, rotary action, into the grasp of the cutting mechanism. I attain these purposes by the construction exhibited in the accompanying drawings, in which—

Figure 1 is a detail plan of said gathering arms, showing their relative position, with reference to each other and to the cutting mechanism. Fig. 2 is a vertical longitudinal section of the outer gathering arm, with part of the spiral conveyer in side elevation. Fig. 3 is a partial vertical section of the inner gathering arm.

Similar letters and numerals refer to similar parts throughout the several views.

As the location and mode of actuating my present invention can be readily understood by reference to the former patent hereinbefore mentioned, I do not deem it necessary to here show or describe any greater portion of the machine than will be necessary to explain the location, construction, and operation of my present invention.

Referring to Fig. 2 of this application, A is a horizontal gas pipe, projected forwardly from below said roller 30 of said former patent, and suitably attached to the frame of the machine, and provided at its forward end with a suitable shoe B.

C is a round bar, suitably attached at its rear end to the frame of the machine above roller 30, which carries the front end of the stalk feeding apron and projected forward and diagonally downward, and connected at its front end with said shoe B, thereby incidentally assisting to brace and support the latter.

D is a beveled gear, seated on the lower end of the shaft of roller 30, and adapted to engage and actuate a beveled pinion E seated on a short horizontal shaft F, journaled in the line of the progress of the machine, and provided with a small gear G, which engages and actuates pinion H seated below gear G upon a shaft J journaled at its rear end in the frame of the machine and extended forwardly through the gas pipe A, and journaled at its forward end in the shoe B, and is there provided with a beveled gear K, which latter in turn engages and actuates a beveled pinion L seated upon gas pipe M, loosely sleeved on the bar C. The gas pipe M is provided peripherally with the spiral flanges N which are so rotated, through the gear connection aforesaid, that the side of said spiral gather next the stalk passage sweeps downward and has its wind toward the machine.

Referring to Figs. 1 and 3, the numeral 21 represents the stalk bending wheel which co-operates with the cutting knife, on the lower surface of which there is formed beveled gear O, adapted to engage a beveled pinion P suitably seated on the machine under gear O. Said pinion P is also provided with a horizontal gear face 1, adapted to engage a pinion R rigidly seated on the rear end of shaft S, which latter extends forward loosely through a gas pipe T. The gas pipe T is attached at its rear end to the frame of the machine, and at its front end to a shoe B in exact similitude to gas pipe A, heretofore described.

On the front end of shaft S there is seated a gear V, which engages and actuates a pinion W seated on a pipe 2, whereby axial rotation is imparted to said pipe. The direction of the rotation of the pipe 2 is such that its side next the stalk passage sweeps downward, and the progress and wind of its spirals N is toward the machine. The pipe 2 is loosely sleeved on a bar 3, attached at its front end to the shoe B at the front end of the gas pipe T, and extends diagonally upward and backward, and is supported at its rear end on the frame of the machine above the aforesaid stalk bending wheel 21.

The operation of my invention is as follows: The sweep of the upper side of the spirals N on both pipes M and 2 is inward, or toward each other, and the joint and several operations of said spirals are to pick up at their front ends corn stalks which are bent over or broken and still attached at their butts to the earth, and to straighten such stalks up, passing the upper portion of them backward on said spirals, so that by the time the cutting mechanism, at the back end of the interval between said spirals, has reached the hill to which said dislodged stalks may belong, the latter are nearly or quite in a vertical position, and in condition to be cut off and passed into the machine along with and in the same manner as the normally vertical stalks. The movement of said spirals is somewhat faster than the progress of the machine.

The shoes B have a pointed front end, adapted to pass under stalks which are bent over, or supported slightly above the surface of the ground. The shoes B have also a sled runner formation at their base, and can be either carried slightly above the surface of the earth, or allowed to come in contact with the latter.

By the peripheral motion of the exterior of the pipes M and 2, with their imposed spirals N, which is faster than the ordinary onward progression of such gathering arms, opportunity is afforded to straighten said dislodged stalks by the time the cutting mechanism shall have reached the locality of the hill to which they belong. One of such spirally flanged arms would be an improvement over present ones; but two are preferable.

What I claim as my invention, and desire to secure by Letters Patent of the United States, is—

1. In a corn harvester, the combination of a horizontal shaft J, provided with driving gear K at its forward end, and at its rear end with the pinion H, and journaled at its forward end in a shoe B, and at its rear end in a suitable portion of the frame of the machine, a suitable driving gear F adapted to engage the pinion H and rotate the shaft J, the diagonally placed pipe M provided with a spiral N, and suitably journaled at its lower and front end in the shoe B, and at its upper and rear end on the frame of the machine, and provided at its front end with the pinion L, adapted to be engaged and actuated by the gear K, substantially as shown and for the purpose specified.

2. In a corn harvester, the combination of a horizontal tube suitably attached at its rear end to the lower portion of the front end of the machine, and projected forwardly therefrom and attached at its front end to a shoe B, a rotating shaft seated in said tube and provided at its rear end with a pinion adapted to be engaged and actuated by a suitable gear carried on the frame of the machine, said shaft being further provided at its forward end with a driving gear, a rod suitably attached at its forward end to the shoe B above the tube aforesaid and projected diagonally upward and rearwardly therefrom and attached at its rear end to the frame of the machine, and the tube M provided with a spiral N, and loosely seated on said diagonal rod and provided at its lower end with a pinion adapted to be engaged and actuated by the adjacent gear on said horizontal rotating shaft, substantially as shown and for the purpose specified.

In testimony whereof I affix my signature in presence of two witnesses.

GEORGE W. PACKER.

Witnesses:
JOHN G. MANAHAN,
MARTHA W. BARRETT.